UNITED STATES PATENT OFFICE.

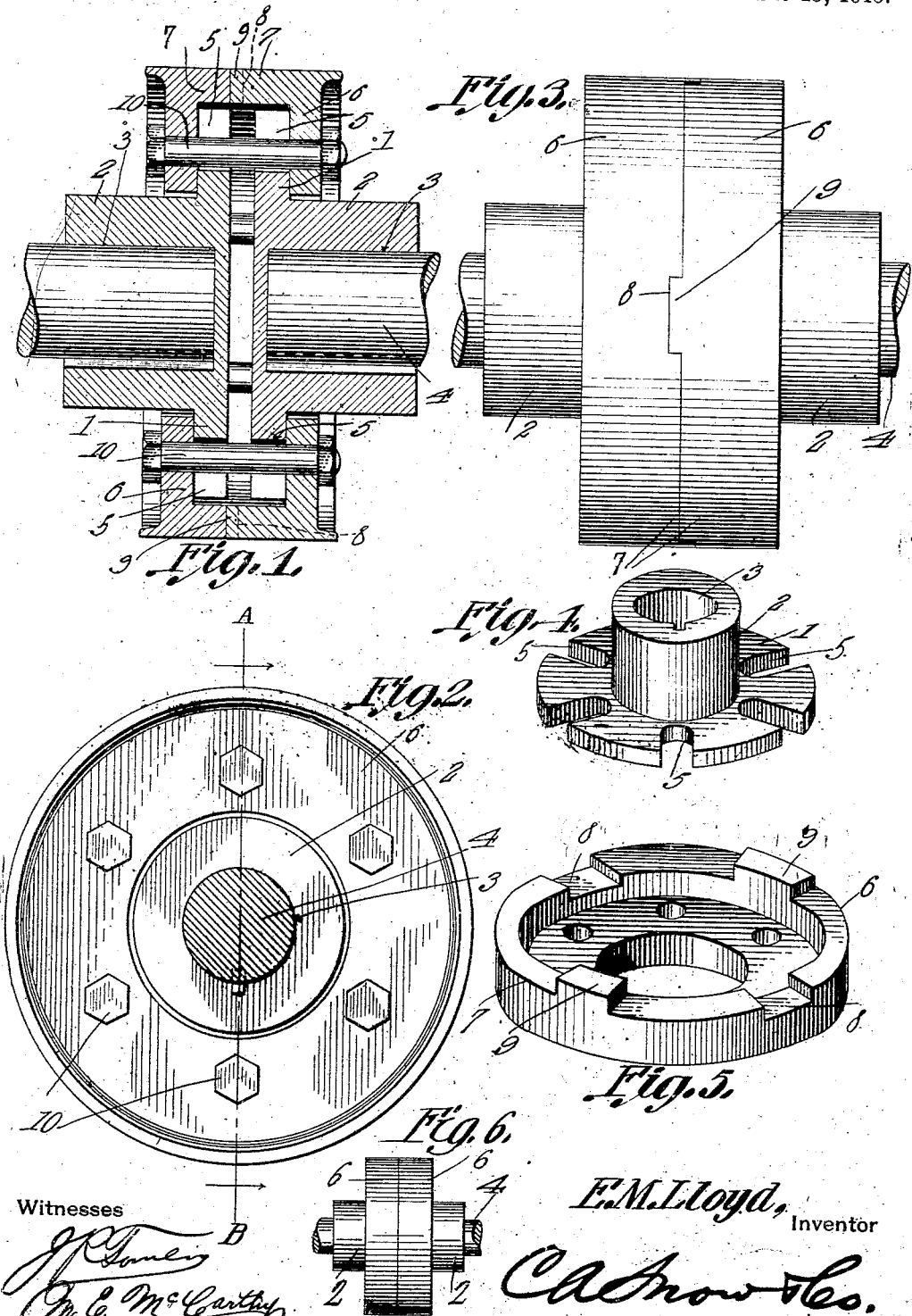

ERNEST MORRIS LLOYD, OF NEW YORK, N. Y.

FLEXIBLE COUPLING.

1,143,054.

Specification of Letters Patent.  Patented June 15, 1915.

Application filed July 10, 1914. Serial No. 850,199.

*To all whom it may concern:*

Be it known that I, ERNEST MORRIS LLOYD, a citizen of the United States, residing at New York city, in the county of New York and State of New York, have invented a new and useful Flexible Coupling, of which the following is a specification.

This invention relates to flexible couplings especially designed for use in connecting two shafts whereby considerable relative movement of the shafts is permitted without producing any lateral strains thereon.

Another object is to provide a coupling which can be connected or disconnected without moving the shafts.

A further object is to provide a coupling utilizing a casing whereby the working parts of the coupling are protected from dust, etc., and lubricant is retained.

Another object is to provide a coupling having no projections likely to catch on clothing and cause injury.

A further object is to provide a coupling the casing of which can be utilized as a pulley for receiving or transmitting power.

Another object is to provide a coupling which permits longitudinal movement of the shafts relative to each other as well as tilting movement.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—Figure 1 is a longitudinal section through the coupling, the shafts being shown in elevation, said section being taken on the line A—B Fig. 2. Fig. 2 is an end elevation of the coupling, the shafts being shown in section. Fig. 3 is a side elevation of the coupling. Fig. 4 is a perspective view of one of the driving disks. Fig. 5 is a perspective view of one of the parts of the outer casing. Fig. 6 is a side elevation on a reduced scale, of another form of coupling.

Referring to the figures by characters of reference 1 designates opposed similar driving disks each of which is formed with an integral hub 2 having a socket 3 in which a shaft 4 is keyed or otherwise secured. Each disk is formed with radial slots 5, the corresponding slots in the two disks being in alinement. The two disks are housed loosely within a casing made up of opposed rings 6 each of which has an inwardly extending annular flange 7 which, in the form shown in Figs. 1, 3 and 5 may be provided with diametrically opposed recesses 8 and diametrically opposed lugs 9. These lugs 9 on each flange are adapted to project into the recesses 8 in the opposed flange. As shown in Fig. 6, however, the recesses 8 and lugs 9 can be dispensed with. In both forms of the structure the two flanges are clamped tightly together by means of bolts 10 which are secured within openings in the rings 6 and extend loosely through the alining slots 5 in the two disks 1. The rings 6 are fitted loosely about the hubs 2 so that the said hubs are free to tilt radially within the rings.

It will be apparent that by providing a coupling such as herein described, either disk 1 is free to move toward the other disk where one shaft shifts longitudinally relative to the other and, as the bolts 10 are fitted loosely in the slots 5, it will be obvious that either or both disks are free to tilt relative to each other within the casing formed by the rings 6 and their flanges. At the same time the bolts, by passing through the slots in the disks, serve as efficient means for coupling together the two disks so that motion will be properly transmitted from one disk to the other or, where the casing is used as a pulley, from said casing to both disks. This casing made up of the rings 6 and their flanges will obviously protect the coupling from dust and will also retain the lubricant. Furthermore, it will be seen that there are no projecting parts on the coupling which would be likely to catch in clothing and cause injury. By unfastening the bolts 10, the members of the casing can be separated and one disk disconnected from the other so that the parts of the coupling can be cleaned.

As hereinbefore stated, the casing made up of the rings 6 and their flanges can be used as a pulley for driving the shafts or for transmitting motion from the shafts.

What is claimed is:—

1. A flexible coupling for shafts including a driving disk for attachment to the end of one shaft, a casing revoluble with the other shaft and housing the disk, said casing being made of opposed sections, and means extending loosely through the disk for coupling the disk to the casing and for securing the parts of the casing together, said disk being slidably and tiltably mounted on said means and relative to the casing.

2. A flexible coupling for shafts, including driving disks for attachment to the ends of the respective shafts, a casing loosely housing the disks, said casing being made of opposed sections, and means extending loosely through the disks for coupling said disks to the casing and for securing the parts of the casing together, said disks being tiltable and slidable relative to each other and to said means.

3. A flexible coupling for shafts, including opposed disks for attachment to the shafts, each of said disks having a central shaft receiving hub, a ring loosely mounted on each hub and adapted to bear against the outer face of the adjacent disk, flanges extending inwardly from the rings, and means connecting the rings for binding the flanges together to form a casing, said means extending loosely through the disks, said disks being normally spaced apart, said disks being tiltable and slidable relative to each other and to the rings.

4. A flexible coupling for shafts, including opposed disks for attachment to the shafts, each of said disks having a central shaft receiving hub, a ring loosely mounted on each hub and adapted to bear against the outer face of the adjacent disk, flanges extending inwardly from the rings and interfitting, and means connecting the rings for binding the flanges together to form a casing, said means extending loosely through the disks, said disks being normally spaced apart and tiltable and slidable relative to each other and to said means.

5. A flexible coupling for shafts, including disks having shaft receiving hubs, a casing made up of opposed sections loosely mounted on the hubs and provided with interfitting annular flanges, said disks being normally spaced apart within the casing, and bolts extending transversely through the casing and disks for holding the parts of the casing together and for coupling the disks to the casing, said disks being mounted for relative sliding and tilting movement upon said bolts.

In testimony that I claim the foregoing as my own, I have hereto affixed my signature in the presence of two witnesses.

ERNEST MORRIS LLOYD.

Witnesses:
ALICE HALBURTON LLOYD,
JANE ELIZABETH LACKEY.